(12) United States Patent
Kim

(10) Patent No.: US 9,459,793 B2
(45) Date of Patent: Oct. 4, 2016

(54) MOBILE TERMINAL AND CONTROLLING METHOD THEREOF

(71) Applicant: LG Electronics Inc., Seoul (KR)

(72) Inventor: Bum Bae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 417 days.

(21) Appl. No.: 14/088,135

(22) Filed: Nov. 22, 2013

(65) Prior Publication Data

US 2014/0082553 A1    Mar. 20, 2014

Related U.S. Application Data

(63) Continuation of application No. 12/824,068, filed on Jun. 25, 2010, now Pat. No. 8,612,885.

(30) Foreign Application Priority Data

Nov. 18, 2009  (KR) .................. 10-2009-0111310

(51) Int. Cl.
*G06F 3/048*       (2013.01)
*G06F 3/041*       (2006.01)
*G06F 3/0488*      (2013.01)
*G06F 3/023*       (2006.01)
*H04W 88/02*       (2009.01)

(52) U.S. Cl.
CPC ......... *G06F 3/04883* (2013.01); *G06F 3/0237* (2013.01); *G06F 3/0416* (2013.01); *G06F 3/04886* (2013.01); *H04W 88/02* (2013.01)

(58) Field of Classification Search
CPC ................. G06F 3/0237; G06F 3/04886
See application file for complete search history.

(56) References Cited

U.S. PATENT DOCUMENTS 5,128,672 A  *  7/1992  Kaehler ............... G06F 3/0238
                                              341/23
5,748,177 A  *  5/1998  Baker .................. G06F 3/0237
                                              340/4.1

(Continued)

FOREIGN PATENT DOCUMENTS

CN      1949158 A      4/2007
EP     2 088 754 A1    8/2009

(Continued)

OTHER PUBLICATIONS

Isokoski, "Performance of Menu-Augmented Soft Keyboards"; Apr. 2004, pp. 423-430; http://dl.acm.org/citation.cfm?id=985692. 985746.

(Continued)

*Primary Examiner* — Scott Baderman
*Assistant Examiner* — Mario M Velez-Lopez
(74) *Attorney, Agent, or Firm* — Birch, Stewart, Kolasch & Birch, LLP

(57) ABSTRACT

A mobile terminal including a touchscreen configured to display a keypad including a plurality of key buttons having assigned first alphabet characters, respectively; and a controller configured to receive a first key input of a first key button of the plurality of key buttons, to display a first alphabet character corresponding to the first key input on a display portion of the mobile terminal, to predict a word that starts with the first alphabet character, to receive a second key input of the first key button after the first key input, and to display a second alphabet character included in the predicted word on the display portion based on the second key input.

12 Claims, 21 Drawing Sheets

(56) References Cited

U.S. PATENT DOCUMENTS

| | | | |
|---|---|---|---|
| 5,920,303 A | 7/1999 | Baker et al. | |
| 5,956,021 A * | 9/1999 | Kubota | G06F 3/04886 345/173 |
| 5,963,671 A * | 10/1999 | Comerford | G06F 3/0237 345/168 |
| 6,359,572 B1 * | 3/2002 | Vale | G06F 3/0237 341/22 |
| 6,724,370 B2 | 4/2004 | Dutta et al. | |
| 7,539,472 B2 | 5/2009 | Sloo | |
| 7,681,145 B1 * | 3/2010 | Pu | G06F 3/0237 715/812 |
| 8,018,441 B2 * | 9/2011 | Shin | G06F 3/04886 345/169 |
| 8,319,742 B2 * | 11/2012 | Doktorova | G06F 3/0233 345/169 |
| 8,422,661 B2 * | 4/2013 | Suzuki | G06F 3/0236 345/156 |
| 2002/0149569 A1 * | 10/2002 | Dutta | G06F 1/1626 345/173 |
| 2003/0025616 A1 * | 2/2003 | Bickerton | G06F 3/0236 341/22 |
| 2007/0046641 A1 * | 3/2007 | Lim | G06F 3/04886 345/173 |
| 2007/0060176 A1 * | 3/2007 | Sloo | G06F 9/4443 455/466 |
| 2009/0007001 A1 | 1/2009 | Morin et al. | |
| 2010/0026650 A1 * | 2/2010 | Srivastava | G06F 3/0237 345/173 |
| 2010/0031143 A1 * | 2/2010 | Rao | G06F 3/0237 715/261 |
| 2010/0039393 A1 * | 2/2010 | Pratt | G06F 3/0236 345/173 |
| 2010/0225591 A1 * | 9/2010 | Macfarlane | G06F 3/0234 345/169 |
| 2010/0231523 A1 * | 9/2010 | Chou | G06F 3/018 345/171 |
| 2011/0035209 A1 * | 2/2011 | Macfarlane | G06F 3/0237 704/9 |
| 2011/0074704 A1 * | 3/2011 | Causey | G06F 3/0237 345/173 |
| 2011/0148787 A1 * | 6/2011 | Kim | G06F 3/04886 345/173 |
| 2011/0163973 A1 * | 7/2011 | Ording | G06F 3/0236 345/173 |
| 2013/0176228 A1 * | 7/2013 | Griffin | G06F 17/276 345/168 |
| 2015/0029090 A1 * | 1/2015 | Kim | G06F 3/04886 345/156 |

FOREIGN PATENT DOCUMENTS

| | | |
|---|---|---|
| JP | 9-160910 A | 6/1997 |
| WO | 2007/047188 A2 | 4/2007 |

OTHER PUBLICATIONS

TypeBooster, TypeBooster.com; Oct. 17, 2008; pp. 1; http://www.typebooster.com/index.php?page=7.

* cited by examiner

MOBILE TERMINAL AND CONTROLLING METHOD THEREOF

This application is a Continuation of co-pending application Ser. No. 12/824,068, filed on Jun. 25, 2010, which claims priority under 35 U.S.C. §119(a) to Korean Application No. 10-2009-0111310, filed on Nov. 18, 2009. The contents of all of the above applications are hereby incorporated by reference in their entireties.

BACKGROUND OF THE INVENTION

1. Field of the Invention

The present invention relates to a mobile terminal and corresponding method of controlling a mobile terminal.

2. Discussion of the Related Art

A mobile terminal can perform various functions such as data and voice communications, capturing images and video via a camera, recording audio, playing music files and outputting music via a speaker system, displaying images and video on a display, playing games, etc. Thus, mobile terminals now function as multimedia players. More recently, mobile terminals have been configured to receive broadcast and multicast signals which permit viewing of contents, such as videos and television programs.

Further, many mobile terminals include touchscreens that allow a user to input information by touching the display. Many users thus now input text messages and other data by touching a keypad displayed on the touchscreen. However, the keypad has key buttons of which number or size is smaller than those of a general personal computer. Thus, the user is often inconvenienced when using the keypad on mobile terminals.

SUMMARY OF THE INVENTION

Accordingly, one object of the present invention is directed to a mobile terminal and controlling method thereof that substantially obviate one or more problems due to limitations and disadvantages of the related art.

Another object of the present invention is to provide a mobile terminal and controlling method thereof, by which a terminal user is further facilitated to input characters via a keypad provided to a mobile terminal having key buttons of which number or size is smaller than that of key buttons provided to a keyboard of a personal computer.

To achieve these objects and other advantages and in accordance with the purpose of the invention, as embodied and broadly described herein, the present invention provides in one aspect a mobile terminal including a touchscreen configured to display a keypad including a plurality of key buttons having intrinsic alphabets, respectively, and a controller, if a desired one of a plurality of the key buttons is first touched, controlling the intrinsic alphabet of the desired key button to be input, predicting a recommended word starting with a first alphabet equal to the intrinsic alphabet of the desired key button, and if the desired key button is second touched after having been first touched, controlling a second alphabet of the recommended word to be input.

In another aspect, the present invention provides a method of controlling a mobile terminal and which includes displaying a keypad including a plurality of key buttons corresponding to intrinsic alphabets, respectively, on a touchscreen, if a desired one of a plurality of the key buttons is first touched, inputting the intrinsic alphabet of the desired key button, predicting a recommended word starting with a first alphabet equal to the intrinsic alphabet of the desired key button, and if the desired key button is second touched after having been first touched, inputting a second alphabet of the recommended word.

In still another aspect, the present invention provides a mobile terminal including a touchscreen configured to display a keypad including a plurality of key buttons having assigned first alphabet characters, respectively, and a controller configured to receive a first key input of a first key button of the plurality of key buttons, to display a first alphabet character corresponding to the first key input on a display portion of the mobile terminal, to predict a word that starts with the first alphabet character, to receive a second key input of the first key button after the first key input, and to display a second alphabet character included in the predicted word on the display portion based on the second key input.

In another aspect, the present invention provides a method of controlling a mobile terminal, and which includes displaying, on a touchscreen of the mobile terminal, a keypad including a plurality of key buttons having assigned first alphabet characters, respectively; receiving, via a controller on the mobile terminal, a first key input of a first key button of the plurality of key buttons; displaying, on a display portion of the mobile terminal, a first alphabet character corresponding to the first key input; predicting, via the controller, a word that starts with the first alphabet character; receiving, via the controller, a second key input of the first key button after the first key input; and displaying, on the display portion, a second alphabet character included in the predicted word based on the second key input.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, a mobile terminal relating to embodiments of the present invention will be described below in more detail with reference to the accompanying drawings. Further, the mobile terminal described in the specification can include a cellular phone, a smart phone, a laptop computer, a digital broadcasting terminal, personal digital assistants (PDA), a portable multimedia player (PMP), a navigation system and so on.

Figure 1:
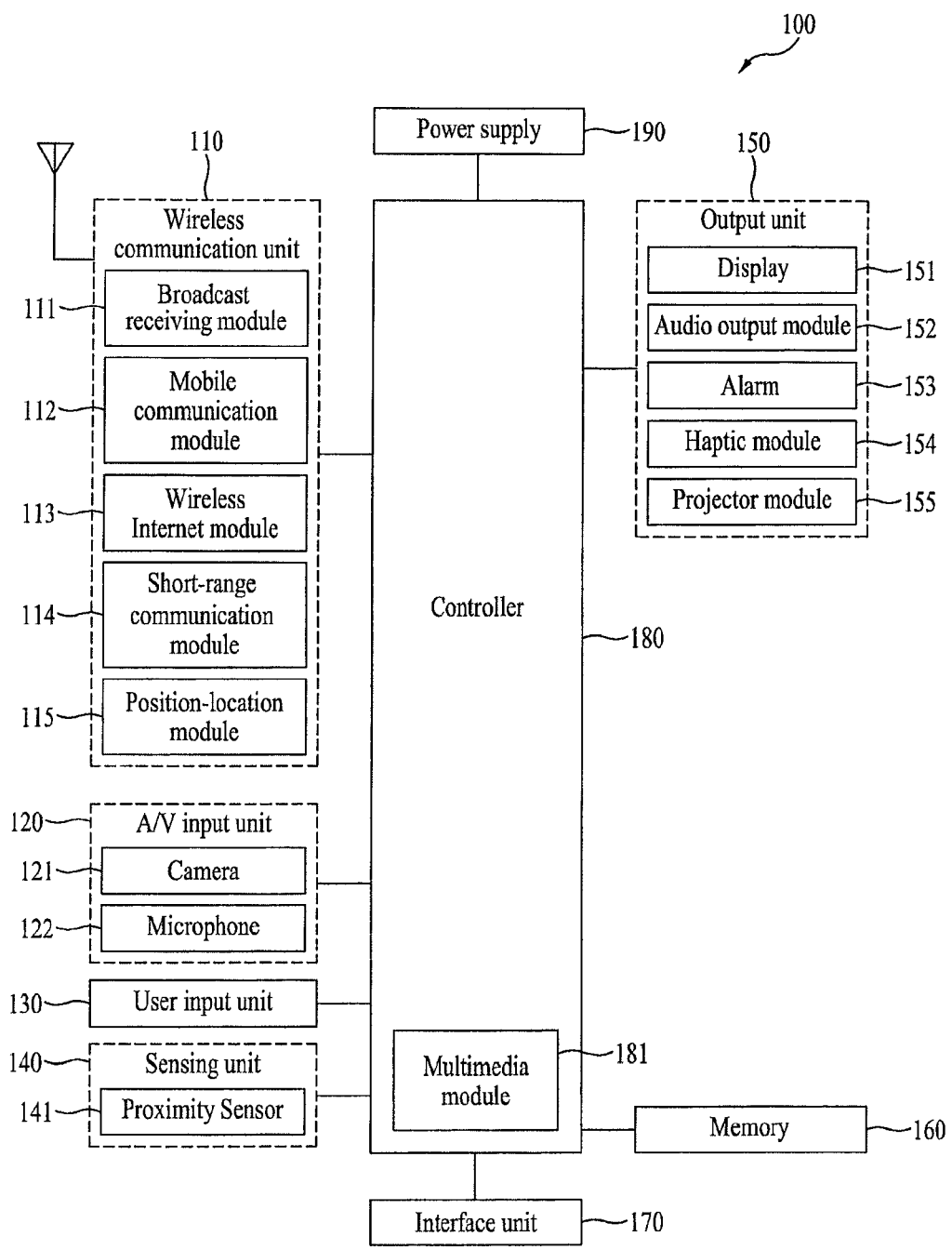
FIG. 1 is a block diagram of a mobile terminal according to one embodiment of the present invention.

FIG. 1 is a block diagram of a mobile terminal 100 according to an embodiment of the present invention. As shown, the mobile terminal 100 includes a radio communication unit 110, an audio/video (A/V) input unit 120, a user input unit 130, a sensing unit 140, an output unit 150, a memory 160, an interface 170, a controller 180, and a power supply 190. Not all of the components shown in FIG. 1 are essential parts and the number of components included in the mobile terminal can be varied.

In addition, the radio communication unit 110 includes at least one module that enables radio communication between the mobile terminal 100 and a radio communication system or between the mobile terminal 100 and a network in which the mobile terminal 100 is located. For example, in FIG. 1, the radio communication unit 110 includes a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel. Further, the broadcasting channel can include a satellite channel and a terrestrial channel. Also, the broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals, but also signals in the form of a combination of a TV broadcasting signal and a radio broadcasting signal.

In addition, the broadcasting related information can be information on a broadcasting channel, a broadcasting program or a broadcasting service provider. The broadcasting related information can be provided even through a mobile communication network. In this instance, the broadcasting related information can be received by the mobile communication module 112. The broadcasting related information can also exist in various forms. For example, the broadcasting related information can exist in the form of an electronic program guide (EPG) of the digital multimedia broadcasting (DMB) system or in the form of an electronic service guide (ESG) of the digital video broadcast-handheld (DVB-H) system.

In addition, the broadcasting receiving module 111 receives broadcasting signals using various broadcasting systems. In particular, the broadcasting receiving module 111 can receive digital broadcasting signals using digital broadcasting systems such as the digital multimedia broadcasting-terrestrial (DMB-T) system, the digital multimedia broadcasting-satellite (DMB-S) system, the media forward link only (MediaFLO) system, and the DVB-H and integrated services digital broadcast-terrestrial (ISDB-T) system. The broadcasting receiving module 111 can also be constructed to be suited to broadcasting systems providing broadcasting signals other than the above-described digital broadcasting systems. The broadcasting signals and/or broadcasting related information received through the broadcasting receiving module 111 can also be stored in the memory 160.

Further, the mobile communication module 112 transmits/receives a radio signal to/from at least one of a base station, an external terminal, and a server on a mobile communication network. The radio signal can include a voice call signal, a video telephony call signal or data in various forms according to transmission and receiving of text/multimedia messages. The wireless Internet module 113 corresponds to a module for wireless Internet access and can be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HS-DPA) and so on can be used as a wireless Internet technique. The local area communication module 114 corresponds to a module for local area communication. Bluetooth, radio frequency identification (RFID), infrared data association (IrDA), ultra wideband (UWB) and ZigBee can be used as a local area communication technique.

In addition, the position information module 115 confirms or obtains the position of the mobile terminal 100. A global positioning system (GPS) module is a representative example of the position information module 115. Further, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude coordinates at a predetermined time. Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and includes a camera 121 and a microphone 122. The camera 121 processes image frames of still images or moving images obtained by an image sensor in a video telephony mode or a photographing mode. The processed image frames can be displayed on a display 151 included in the output unit 150. In addition, the image frames processed by the camera 121 can be stored in the memory 160 or transmitted to an external device through the radio communication unit 110. The mobile terminal 100 can also include at least two cameras according to constitution of the terminal.

Further, the microphone 122 receives an external audio signal in a call mode, a recording mode or a speed recognition mode and processes the received audio signal into electric audio data. The audio data can also be converted into a form that can be transmitted to a mobile communication base station through the mobile communication module 112 and output in the call mode. The microphone 122 can employ various noise removal algorithms for removing noise generated when the external audio signal is received.

In addition, the user input unit 130 receives input data for controlling the operation of the terminal from a user. The user input unit 130 can include a keypad, a dome switch, a touch pad (constant voltage/capacitance), jog wheel, jog switch and so on. The sensing unit 140 senses the current state of the mobile terminal 100, such as an open/close state of the mobile terminal 100, the position of the mobile terminal 100, whether a user touches the mobile terminal 100, the direction of the mobile terminal 100 and acceleration/deceleration of the mobile terminal 100 and generates a detection signal for controlling the operation of the mobile terminal 100. For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 also includes a proximity sensor 141 in FIG. 1.

In addition, the output unit 150 generates visual, auditory or tactile output and in FIG. 1 includes the display 151, an audio output module 152, an alarm 153, a haptic module 154, and a projector module 155. The display 151 displays information processed by the mobile terminal 100. For example, the display 151 displays a UI or graphic user interface (GUI) related to a telephone call when the mobile terminal is in the call mode. The display 151 also displays a captured or/and received image, UI or GUI when the mobile terminal 100 is in the video telephony mode or the photographing mode.

The display 151 can also include at least one of a liquid crystal display, a thin film transistor liquid crystal display, an organic light-emitting diode display, a flexible display and a three-dimensional display. Some of these displays can be of a transparent type or a light transmission type, which is referred to as a transparent display. The transparent display also includes a transparent liquid crystal display. The rear structure of the display unit 151 can also be of the light transmission type. According to this structure, a user can see an object located behind the body of the mobile terminal 100 through an area of the body of the mobile terminal 100, which is occupied by the display 151.

Further, the mobile terminal 100 can include at least two displays 151 according to constitution of the terminal. For example, the mobile terminal 100 can include a plurality of displays that are arranged on a single face at a predetermined distance or integrated. Otherwise, the plurality of displays can be arranged on different sides. In addition, when the display 151 and a sensor sensing touch (referred to as a touch sensor hereinafter) form a layered structure, which is referred to as a touch screen hereinafter, the display 151 can be used as an input device in addition to an output device. The touch sensor can be in the form of a touch film, a touch sheet and a touch pad, for example.

Also, the touch sensor can be constructed such that it converts a variation in pressure applied to a specific portion of the display 151 or a variation in capacitance generated at a specific portion of the display 151 into an electric input signal. The touch sensor can also be constructed such that it can sense pressure of touch as well as the position and area of touch. When touch input is applied to the touch sensor, a signal corresponding to the touch input is transmitted to a touch controller. The touch controller then processes the signal and transmits data corresponding to the processed signal to the controller 180. Accordingly, the controller 180 can detect a touched portion of the display 151.

Referring to FIG. 1, the proximity sensor 141 can be located in an internal region of the mobile terminal 100, surrounded by the touch screen, or near the touch screen. The proximity sensor 141 senses an object approaching a predetermined sensing face or an object located near the proximity sensor 141 using an electromagnetic force or infrared rays without having mechanical contact. Further, the proximity sensor 141 has a lifetime longer than that of a contact sensor and has wide application. The proximity sensor 141 also includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

In addition, a capacitive touch screen is constructed such that a proximity of a pointer is detected through a variation in an electric field according to the proximity of the pointer. In this instance, the touch screen (touch sensor) can be classified as a proximity sensor. For convenience of explanation, an action of approaching the pointer to the touch screen while the pointer is not in contact with the touch screen such that the location of the pointer on the touch screen is recognized is referred to as a "proximity touch" and an action of bringing the pointer into contact with the touch screen is referred to as a "contact touch" in the following description. Also, a proximity touch point of the pointer on the touch screen means a point of the touch screen to which the pointer corresponds perpendicularly to the touch screen when the pointer proximity-touches the touch screen.

Further, the proximity sensor 141 senses a proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can also be displayed on the touch screen.

Also, the audio output module 152 can output audio data received from the radio communication unit 110 or stored in the memory 160 in a call signal receiving mode, a telephone call mode or a recording mode, a speech recognition mode and a broadcasting receiving mode. The audio output module 152 also outputs audio signals related to functions (for example, a call signal incoming tone, a message incoming tone, etc.) performed in the mobile terminal 100. The audio output module 152 can include a receiver, a speaker, a buzzer, etc.

The alarm 153 outputs a signal for indicating a generation of an event of the mobile terminal 100. Examples of events generated in the mobile terminal 100 include receiving a call signal, receiving a message, inputting a key signal, inputting touch, etc. The alarm 153 can also output signals in forms different from video signals or audio signals, for example, a signal for indicating a generation of an event through vibration. The video signals or the audio signals can also be output through the display unit 151 or the audio output module 152.

In addition, the haptic module 154 generates various haptic effects that the user can feel. A representative example of the haptic effects is vibration. The intensity and pattern of vibration generated by the haptic module 154 can also be controlled. For example, different vibrations can be combined and output or sequentially output. The haptic module 154 can also generate a variety of haptic effects including an effect of stimulus according to an arrangement of pins vertically moving for a contact skin face, an effect of stimulus according to a jet force or sucking force of air through a jet hole or a sucking hole, an effect of stimulus of rubbing the skin, an effect of stimulus according to contact of an electrode, an effect of stimulus using an electrostatic force and an effect according to reproduction of cold and warmth using an element capable of absorbing or radiating heat in addition to vibrations. Further, the haptic module 154 can not only transmit haptic effects through direct contact but also allow the user to feel haptic effects through kinesthetic sense of his or her fingers or arms. The mobile terminal 100 can also include at least two or more haptic modules 154 according to constitution of the mobile terminal.

The projector module 155 is an element for performing an image projector function using the mobile terminal 100.

That is, the projector module 155 can display an image, which is identical to or partially different at least from the image displayed on the display 151, on an external surface such as a wall or screen according to a control signal of the controller 180. In particular, the projector module 155 includes a light source generating light (e.g., laser) for projecting an image, an image producing unit for producing an image to be projected using the light generated from the light source, and a lens for enlarging the image to be projected in a predetermined focus distance. In addition, the projector module 155 can include an adjustment device for adjusting an image projected direction by mechanically moving the lens or the whole module.

Further, the projector module 155 can be classified into a CRT (cathode ray tube) module, an LCD (liquid crystal display) module, a DLP (digital light processing) module or the like according to a device type of a display mechanism. In particular, the DLP module is operated by the mechanism of enabling the light generated from the light source to reflect on a DMD (digital micro-mirror device) chip and can be advantageous for the downsizing of the projector module 151. Preferably, the projector module 155 can be provided in a length direction of a lateral, front or backside direction of the mobile terminal 100. The projector module 155 can also be provided to any portion of the mobile terminal 100.

In addition, the memory 160 stores a program for the operation of the controller 180 and temporarily stores input/output data (for example, phone book, messages, still images, moving images, etc.). The memory 160 can also store data about vibrations and sounds in various patterns, which are output when a touch input is applied to the touch screen. The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can also operate in relation to a web storage performing the storing function of the memory 160 on the Internet.

Further, the interface 170 serves as a path to all external devices connected to the mobile terminal 100. The interface 170 receives data or power from the external devices and transmits the data or power to the internal components of the mobile terminal 100 or transmits data of the mobile terminal 100 to the external devices. The interface 170 can also include a wired/wireless headset port, an external charger port, a wired/wireless data port, a memory card port, a port for connecting a device having a user identification module, an audio I/O port, a video I/O port, an earphone port, etc., for example.

In addition, an identification module is a chip that stores information for authenticating the authority to use the mobile terminal 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the mobile terminal 100 through a port.

Also, the interface 170 can serve as a path through which power from an external cradle is provided to the mobile terminal 100 when the mobile terminal 100 is connected to the external cradle or a path through which various command signals input by the user through the cradle to the mobile terminal 100. The various command signals or power input from the cradle can be used as a signal for confirming whether the mobile terminal 100 is correctly set in the cradle.

The controller 180 controls the overall operation of the mobile terminal. For example, the controller 180 performs control and processing for voice communication, data communication and video telephony. In FIG. 1, the controller 180 includes a multimedia module 181 for playing multimedia. The multimedia module 181 can be included in the controller 180 or separated from the controller 180. Further, the controller 180 can perform a pattern recognition process capable of recognizing handwriting input or picture-drawing input applied to the touch screen as characters or images. In addition, the power supply 190 receives external power and internal power and provides power required for the operations of the components of the mobile terminal under the control of the controller 180.

Further, various embodiments of the present invention can be implemented in a computer or similar device readable recording medium using software, hardware or a combination thereof, for example. According to a hardware implementation, the embodiments of the present invention can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. The embodiments can also be implemented by the controller 180.

According to a software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Figure 2A:
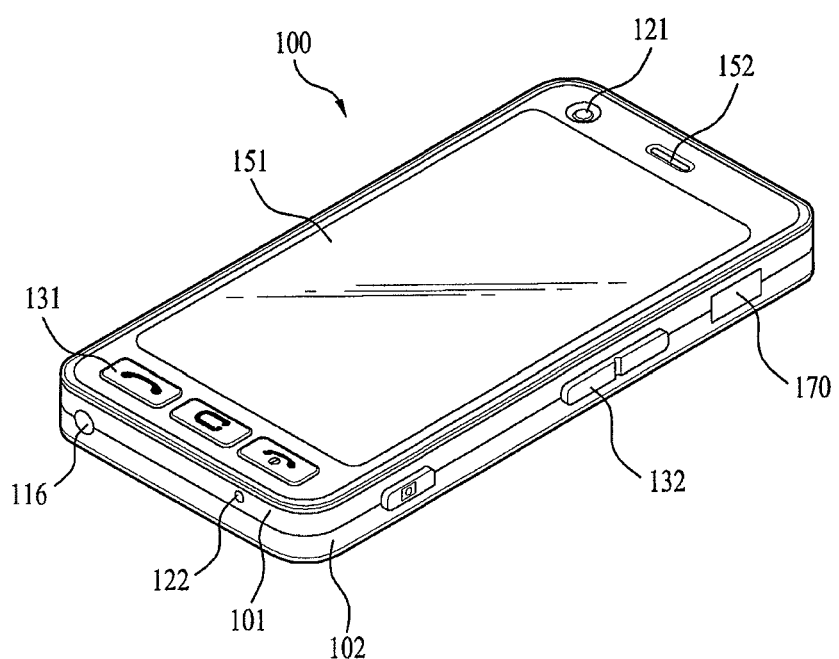
FIG. 2A is a front perspective diagram of a mobile terminal according to one embodiment of the present invention.

Next, FIG. 2A is a front perspective view of a mobile terminal or a handheld terminal 100 according to an embodiment of the present invention. As shown, the mobile terminal 100 is a bar type terminal body. However, the present invention is not limited to a bar type terminal and can be applied to terminals of various types including a slide type, folder type, swing type and swivel type terminals having at least two bodies that are relatively movably combined.

In addition, the terminal body includes a case (a casing, a housing, a cover, etc.) forming the exterior of the terminal 100. In the present embodiment, the case is divided into a front case 101 and a rear case 102. Various electronic components are also arranged in the space formed between the front case 101 and the rear case 102. At least one middle case can be additionally arranged between the front case 101 and the rear case 102. The cases can also be formed of plastics through injection molding or be made of a metal material such as stainless steel (STS) or titanium (Ti).

In addition, the display 151, the audio output unit 152, the camera 121, user input units 131 and 132 of the user input unit 130 (FIG. 1), the microphone 122 and the interface 170 are arranged in the terminal body, specifically, in the front case 101. Also, the display 151 occupies most part of the main face of the front case 101. The audio output unit 152 and the camera 121 are arranged in a region in proximity to one of both ends of the display 151 and the user input unit 131 and the microphone 122 are located in a region in proximity to the other end of the display 151. In addition, the user input unit 132 and the interface 170 are arranged on the sides of the front case 101 and the rear case 102.

Further, the user input unit 130 is operated to receive commands for controlling the operation of the handheld terminal 100 and can include the operating units 131 and 132. The operating units 131 and 132 can be referred to as manipulating portions and employ any tactile manner in which a user operates the operating units 131 and 132 while having tactile feeling. The operating units 131 and 132 can also receive various inputs. For example, the operating unit 131 receives commands such as start, end and scroll, and the second operating unit 132 receives commands such as control of the volume of sound output from the audio output unit 152 or conversion of the display 151 to a touch recognition mode.

Figure 2B:
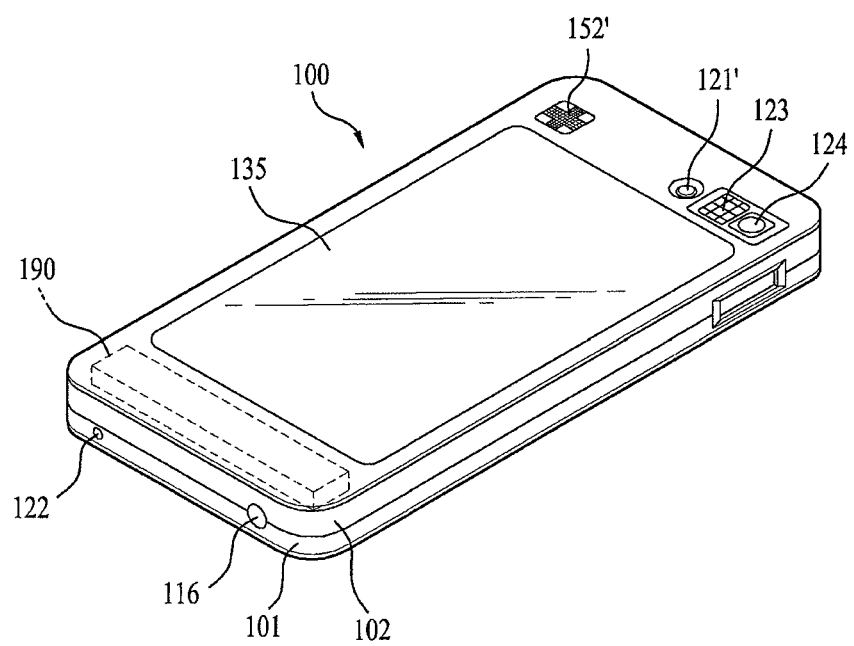
FIG. 2B is a rear perspective diagram of a mobile terminal according to one embodiment of the present invention.

Next, FIG. 2B is a rear perspective view of the mobile terminal 100 shown in FIG. 2A according to an embodiment of the present invention. Referring to FIG. 2B, a camera 121' is additionally attached to the rear side of the terminal body, that is, the rear case 102. The camera 121' has a photographing direction opposite to that of the camera 121 shown in FIG. 2A and can have pixels different from those of the camera 121 shown in FIG. 2A. For example, it is preferable that the camera 121 has low pixels such that it can capture an image of the face of a user and transmit the image to a receiving part for video telephony, while the camera 121' has high pixels because it captures an image of a general object and does not immediately transmit the image in many instances. The cameras 121 and 121' can also be attached to the terminal body such that they can be rotated or pop-up.

A flash bulb 123 and a mirror 124 are also arranged in proximity to the camera 121'. The flash bulb 123 lights an object when the camera 121' takes a picture of the object, and the mirror 124 is used for the user to look at his/her face in the mirror when the user wants to self-photograph himself/herself using the camera 121'. An audio output unit 152' is also provided on the rear side of the terminal body. The audio output unit 152' can thus achieve a stereo function with the audio output unit 152 shown in FIG. 2A and be used for a speaker phone mode when the terminal is used for a telephone call.

A broadcasting signal receiving antenna 124 is also attached to the side of the terminal body in addition to an antenna for telephone calls. The antenna 124 constructing a part of the broadcasting receiving module 111 shown in FIG. 1 can be set in the terminal body such that the antenna 124 can be retracted from the terminal body. Further, the power supply 190 for providing power to the handheld terminal 100 is set in the terminal body. The power supply 190 can be included in the terminal body or detachably attached to the terminal body. A touch pad 135 for sensing touch is also attached to the rear case 102. The touch pad 135 can be of a light transmission type as the display 151. In this instance, if the display 151 outputs visual information through both sides thereof, the visual information can be recognized through the touch pad 135. The information output through both sides of the display 151 can also be controlled by the touch pad 135. Otherwise, a display is additionally attached to the touch pad 135 such that a touch screen can be arranged even in the rear case 102.

The touch pad 135 also operates in connection with the display 151 of the front case 101. The touch pad 135 can be located in parallel with the display 151 behind the display 151, and can be identical to or smaller than the display 151 in size.

Figure 3:
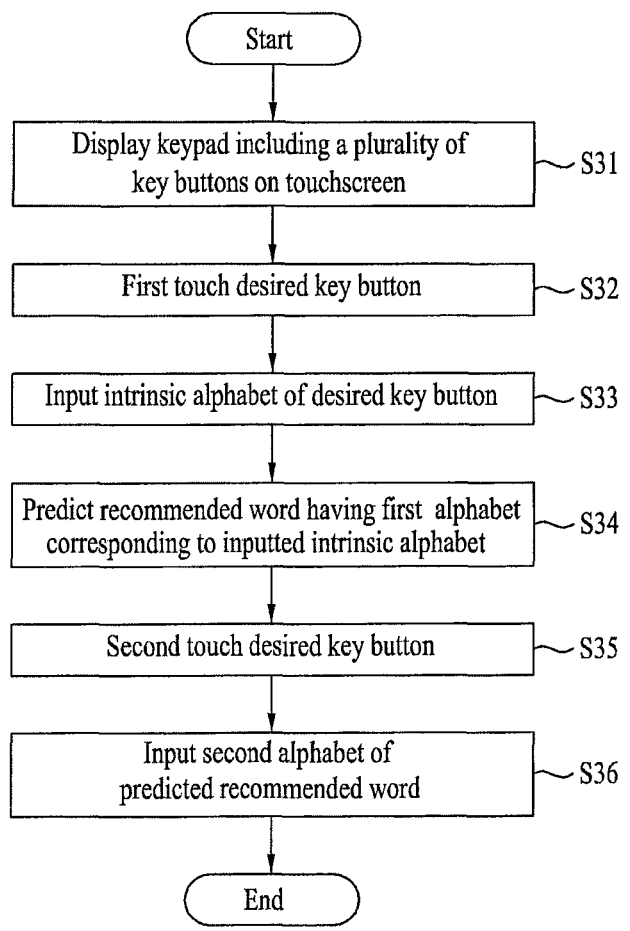
FIG. 3 is a flowchart illustrating a method of controlling a mobile terminal according to an embodiment of the present invention.

Turning, next to FIG. 3, which is a flowchart illustrating a method of controlling a mobile terminal according to an embodiment of the present invention. In this embodiment, it is assumed that the mobile terminal 100 is executing a character inputting function such as a function of writing a message (e.g., short text message, multimedia message, email, etc.), a function of inputting a name of a correspondent party in a phonebook list, and a function of inputting a URL, ID, password and search word to a text input box of a webpage and the like.

Figure 4:
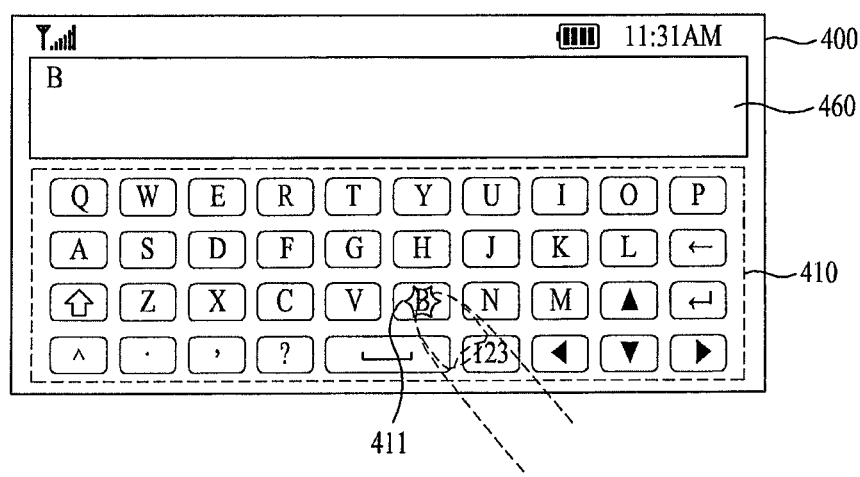
FIGS. 4 to 16D are different display screens illustrating a method of controlling a mobile terminal according to an embodiment of the present invention is implemented.

Thus, as shown in FIG. 3, a plurality of key buttons are displayed on the touchscreen (S31). The display 151 in this embodiment includes a touch screen. Optionally, a hardware type keypad can be provided to the mobile terminal 100 to be used when inputting characters. FIG. 4 illustrates a touchscreen 400 including a keypad 410 having a plurality of key buttons which include alphabetic key buttons (e.g., key buttons corresponding to A to Z) having intrinsic alphabets, respectively. Further, the intrinsic alphabets can include English alphabets, Korean alphabets (consonants and vowels), Japanese alphabets (hiragana and katakana) and the like. In the following description, the intrinsic alphabets include English alphabets.

FIG. 4 also illustrates a first key button 411 including an indicator "B" indicating the intrinsic alphabet for this key is the letter "B". The key buttons of the keypad 410 can also include at least one of a symbol key button, a numeral key button, a space key button, a backspace key button, an enter key button, etc. In the following description, the key buttons other than the alphabet key buttons will be referred to as 'additional key buttons'. FIG. 4 also illustrates an input text window 460 for displaying text input via the keypad 410.

Next, as shown in FIG. 3, the first key button 411 corresponding to a desired one of the alphabet key buttons is touched by a user (S32), and then the intrinsic alphabet 'B' of the first key button 411 is input and displayed on the input text window 460 (S33). FIG. 4 also illustrates this feature. Then, with reference to FIG. 3, the controller 180 predicts a word based on the first input character (S34) and that is recommended to the user.

Figure 5A:
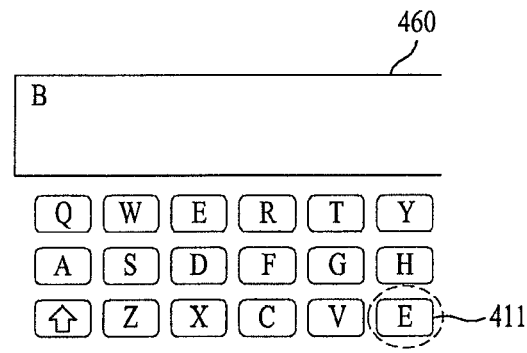

In more detail, embodiments of the present invention provide various methods of providing the terminal user with a recommended or predicted word. The following description assumes the recommended word according to the input intrinsic alphabet 'B' is 'BEST'. Then, as shown in FIG. 5A, the identifier of the intrinsic alphabet 'B' displayed on the first key button 411 is changed to an identifier of the second alphabet 'E' of the recommended or predicted word.

Figure 5B:
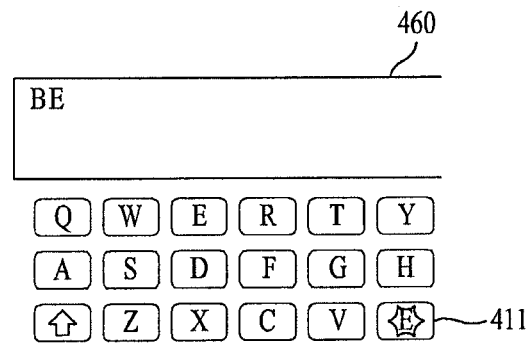
Figure 5C:
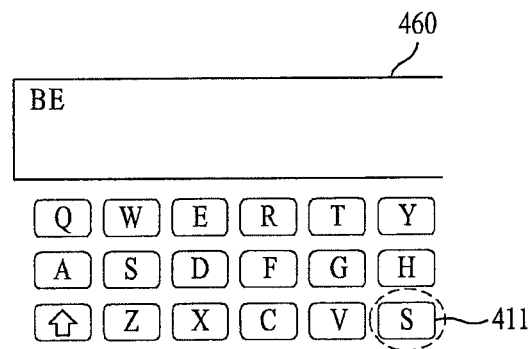

Subsequently, referring to FIGS. 3 and 5B, the user can again touch the first key button 411 (S35). Then, the second alphabet 'E' of the predicted word is input and displayed on the input text window 460 (S36). Subsequently, referring to FIG. 5C, the identifier of the second alphabet 'E' of the predicted word displayed on the first key button 411 is changed to an identifier of the third alphabet 'S' of the predicted word.

In this manner, the user can easily input a desired word by simply pressing the first key button 411 four times consecutively. After the desired word has been completely input, the first key button 411 can be changed back to have the identifier of the intrinsic alphabet 13'. Thus, referring to FIGS. 5A to 5C, as the identifier displayed on the first key button 441 is changed or converted into a next character of the predicted word, the user can know in advance which alphabet is to be input next each time the first key button 441 is touched consecutively.

Figure 6A:
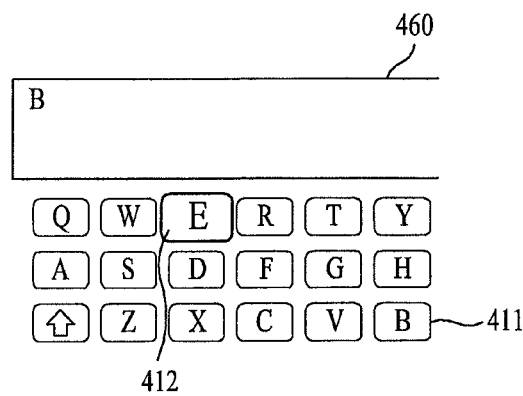
Figure 6B:
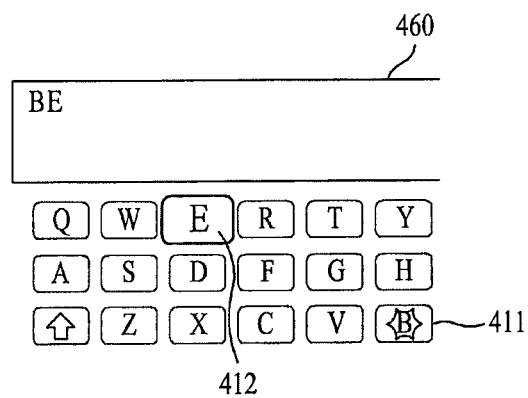
Figure 6C:
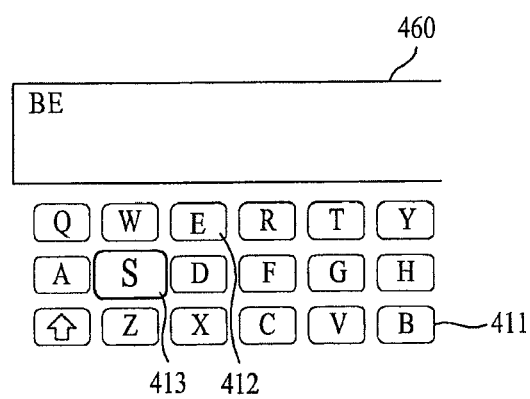

Next, FIGS. 6A to 6C illustrating an alternative embodiment of informing the user about what the next character is for the predicted word. In more detail, when the user touches the first key button 411 corresponding to a desired one of the alphabet key buttons, the intrinsic alphabet 'B' of the first key button 411 is input and displayed on the input text window 460.

Subsequently, referring to FIG. 6A, a second key button 412 corresponding to the second alphabet 'E' of the predicted word is displayed in a manner of being visually discriminated from the other key buttons. FIG. 6A illustrates the second key button 412 being displayed in a manner of having a size greater than that of the rest of the key buttons, by which embodiments of the present invention are non-limited. For example, the second key button 412 can be visually discriminated from other key buttons in a manner of differing in at least one of size, color and style.

Thus, the user can see that if he or she again touches the first key button 411, the character "E" will be input. That is, referring to FIG. 6B, when the user again touches the first key button 411, the second alphabet 'E' of the predicted word is input and then displayed in the input text window 460. Referring to FIG. 6C, the second key button 412 corresponding to the second alphabet 'E' of the predicted word is then restored to its original shape. Also, a third key button 413 corresponding to a third alphabet 'S' of the predicted word is displayed in a manner of being visually discriminated from the other key buttons.

Thus, as shown in FIGS. 6A to 6C, each time the first key button 411 is consecutively touched, each key button corresponding to an alphabet that is going to be input next is sequentially displayed in a manner of being visually discriminated from the other key buttons. Therefore, the user can know the next alphabet that is going to be input if they again touch the first key button 411.

Figure 7A:
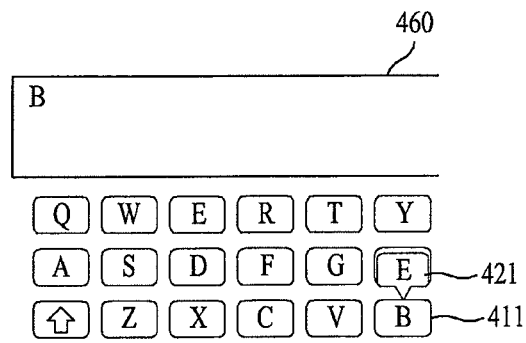
Figure 7B:
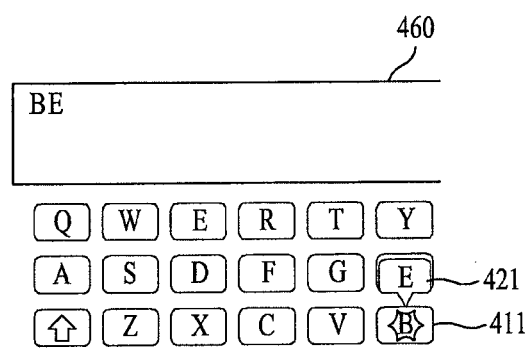
Figure 7C:
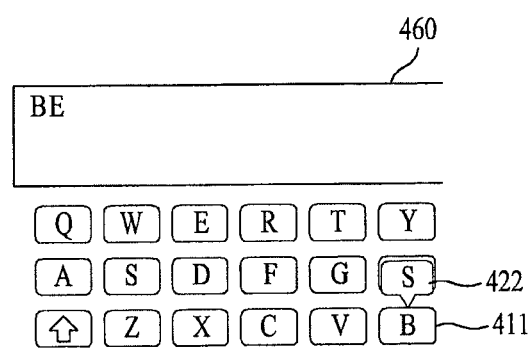

Next, FIGS. 7A to 7C illustrating an alternative embodiment of informing the user about what the next character is for the predicted word. As discussed previously, when the user first touches the first key button 411, the intrinsic alphabet 'B' of the first key button 411 is input and displayed in the input text window 460.

Referring to FIG. 7A, the controller 180 displays a first indicator 421 indicating the second alphabet 'E' of the predicted word. In addition, the first indicator 421 is displayed on the first key button 411, by which the present invention is non-limited. For example, the first indicator 421 can be displayed on another spot on the touchscreen 400.

Referring to FIG. 7B, the user again touches the first key button 411 and the second alphabet 'E' of the predicted word is input and displayed in the input text window 460. Referring to FIG. 7C, the controller 180 removes the first indicator 421 indicating the second alphabet 'E' of the predicted word and displays a second indicator 422 indicating the third alphabet 'S' of the predicted word on the spot from where the first indicator 421 was displayed.

Thus, in FIGS. 7A to 7C, each time the user consecutively touches the first key button 411, the controller 180 displays indicators corresponding to alphabets to be next input. Therefore, the user can know what alphabet is going to be input next.

Figure 8A:
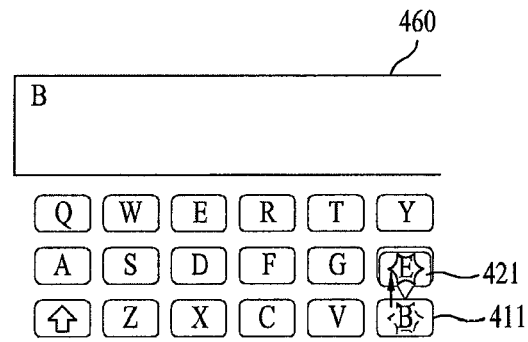
Figure 8B:
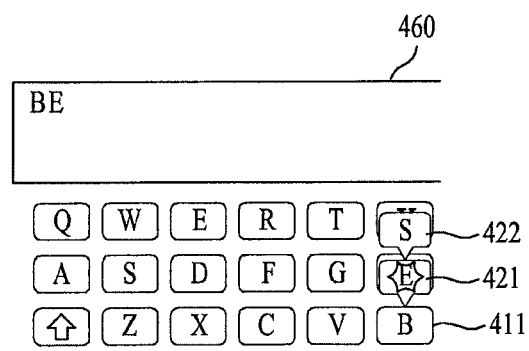
Figure 8C:
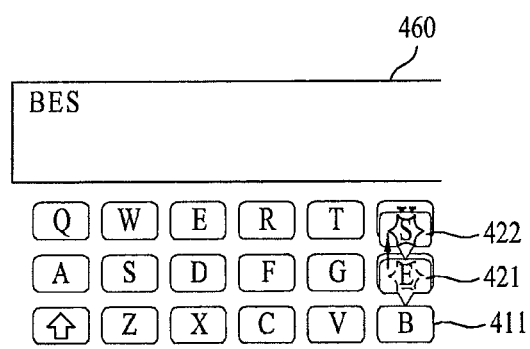

Next, FIGS. 8A to 8C illustrating an alternative embodiment of informing the user about what the next character is for the predicted word. As discussed previously, when the user first touches the first key button 411, the intrinsic alphabet 'B' of the first key button 411 is input and displayed in the input text window 460.

Referring to FIG. 8A, the controller 180 displays the first indicator 421 indicating the second alphabet 'E' of the predicted word on the first key button 411. Subsequently, the user touches the first indicator 421 or performs a touch & drag from the first key button 411 to the first indicator 421 from (or vice-versa). Then, referring to FIG. 8B, the second alphabet 'E' of the predicted word is input and displayed in the input text window 460. Similarly, the controller 180 displays the second indicator 422 indicating the third alphabet 'S' of the predicted word on the first indicator 421.

Referring to FIG. 8C, the user touches the second indicator 422 or performs a touch & drag operation from the first indicator 411 to the second indicator 422 (or vice-versa). The third alphabet 'S' of the predicted word is then input and displayed in the input text window 460. Thus, in FIGS. 8A to 8C, each time the user consecutively touches the first key button 411, the controller 180 displays indicators corresponding to alphabets input next. Therefore, the user can know what the next alphabet is going to be input. Moreover, when the neighboring indicators are sequentially touched, the corresponding alphabets can be sequentially input.

Figure 9A:
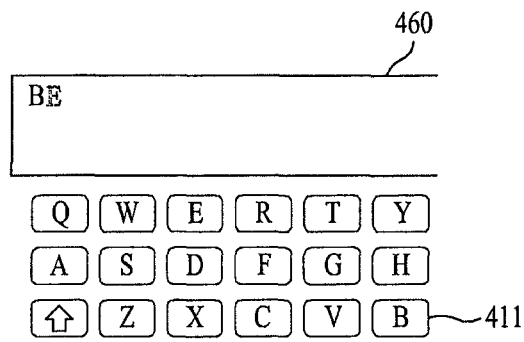
Figure 9B:
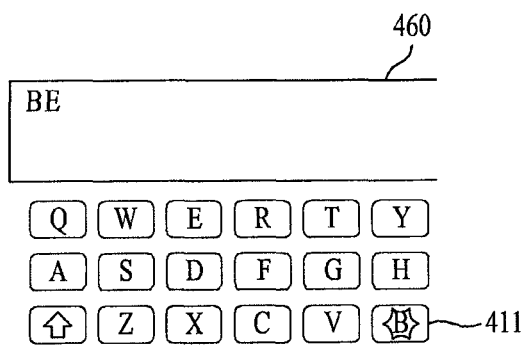
Figure 9C:
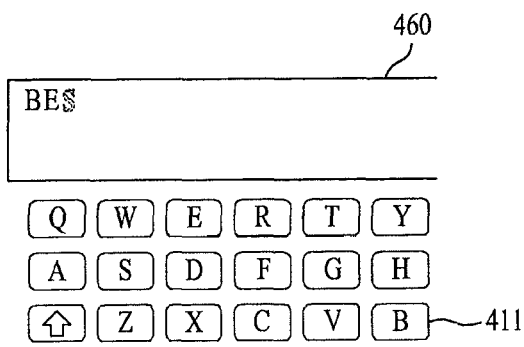

Next, FIGS. 9A to 9C illustrating an alternative embodiment of informing the user about what the next character is for the predicted word. As discussed previously, when the user first touches the first key button 411, the intrinsic alphabet 'B' of the first key button 411 is input and displayed in the input text window 460. FIG. 4 shows that the intrinsic alphabet 'B' is displayed as a solid line.

Referring to FIG. 9A, the second alphabet 'E' of the predicted word is displayed in the input text window 460 in a manner of having a style different from that of the input intrinsic alphabet 'B', i.e., a dotted line. That is, FIG. 9A shows that the second alphabet 'E' of the predicted word is displayed with a dotted line, while the input intrinsic alphabet 'B' is displayed with a solid line, by which the embodiment of the present invention is non-limited. For example, the second alphabet 'E' of the predicted word can visually discriminated from the input intrinsic alphabet 'B' using different methods such as blinking the alphabet 'E', etc.

Subsequently, the user again touches the first key button 411, and the second alphabet 'E' of the predicted word is input and displayed. In more detail, referring to FIG. 9B, the input second alphabet 'E' of the predicted word is displayed with a solid line instead of the previous dotted line. Referring to FIG. 9C, the third alphabet 'S' of the predicted word is then displayed as a doted line in the input text window 460.

Thus, in FIGS. 9A to 9C, each time the user consecutively touches the first key button 411, the alphabets to be input next are displayed in a shape different from that of an already input alphabet in the input text window 460. Therefore, the user can know what alphabet is going to be input next.

Next, FIGS. 10A to 10F illustrating an alternative embodiment of informing the user about what the next character is for the predicted word. As discussed previously, when the user first touches the first key button 411, the intrinsic alphabet 'B' of the first key button 411 is input and displayed in the input text window 460. Again, FIG. 4 shows that the intrinsic alphabet 'B' is displayed as a solid line.

Figure 10A:
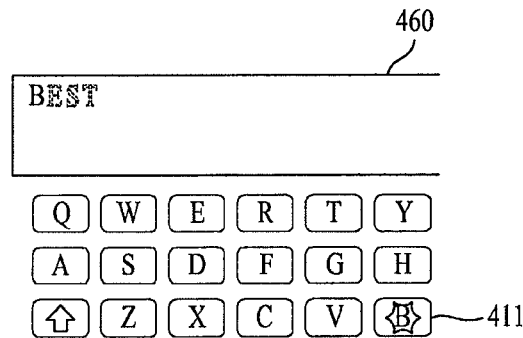

Referring to FIG. 10A, the rest of the alphabets 'E', 'S' and 'T' of the predicted word except the first input intrinsic alphabet 'B' are displayed in the input text window 460 in a shape different from that of the input intrinsic alphabet 'B', i.e., using dotted lines in this example. Subsequently, the user again touches the first key button 411, and the second alphabet 'E' of the predicted word is input and changed into a solid line.

Figure 10B:
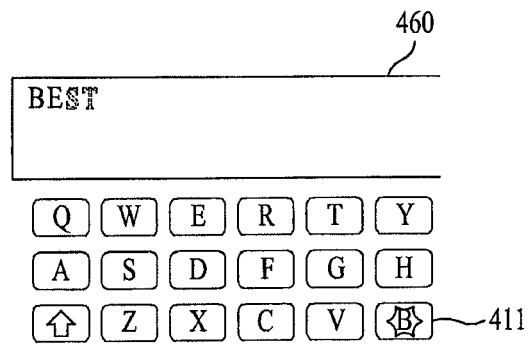

That is, referring to FIG. 10B, the input second alphabet 'E' is displayed in the input text window 460 using a solid line instead of a dotted line. Subsequently, the user again touches the key button 411, and the third alphabet 'S' of the predicted word is input and displayed with a solid line as shown FIG. 10C.

Figure 10C:
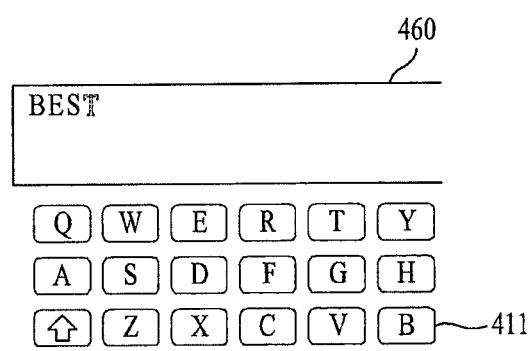

Thus, in FIGS. 10A to 10C, when the user touches the key button 441 for the first time, the rest of the alphabets 'E', 'S' and 'T' of the predicted word except the input intrinsic alphabet 'B' are displayed in a shape different from that of the input intrinsic alphabet 'B'. Then, each time the user consecutively touches the first key button 411, the corresponding alphabet is changed from a dotted line to a solid line to have the same style of the intrinsic alphabet 'B'.

Figure 10D:
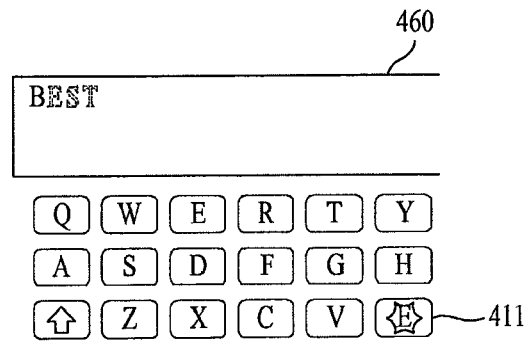
Figure 10E:
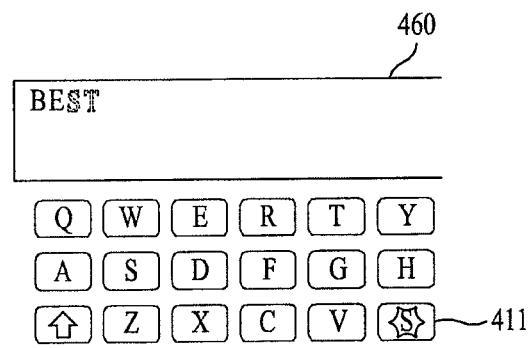
Figure 10F:
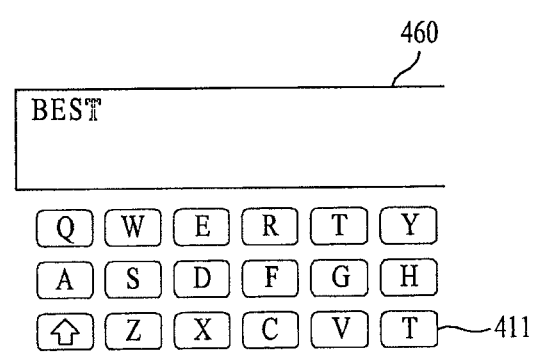

Meanwhile, referring to FIGS. 10D to 10F, the controller 180 can change an identifier displayed on the first key button 441 according to the predicted word as soon as the rest of the alphabets of the predicted word are displayed in the input text window 460. In particular, the identifier of the first key button 411 can be changed to an identifier of an alphabet that is going to be input each time the first key button 411 is consecutively touched. Further, not all of the entire rest of the alphabets to be sequentially inputted each time the first key button 411 is consecutively touched have to be displayed.

Figure 11A:
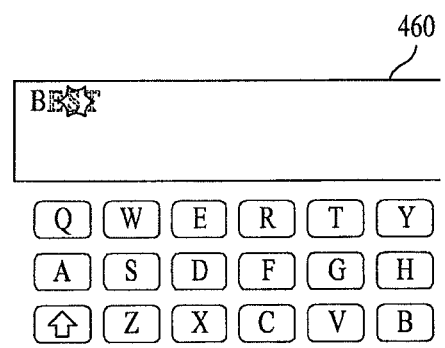
Figure 11B:
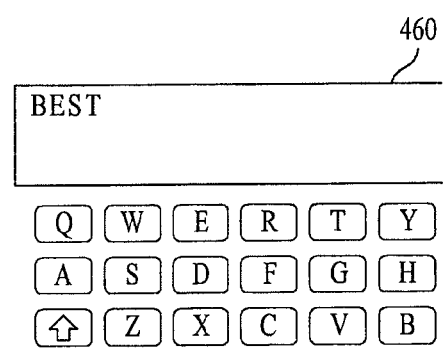

Next, and referring to FIG. 11A, the entire rest of the alphabets 'E', 'S' and 'T' of the predicted word except the input intrinsic alphabet 'B' are displayed in the input text window 460 in a manner of having a style different from that of the input intrinsic alphabet 'B'. In addition, in this embodiment, the user then touches the displayed predicted word. Rather than touching the word, the user can also manipulate the user input unit. Then, referring to FIG. 11B, the entire rest of the alphabets of the predicted word are simultaneously input and displayed in a same style as the intrinsic alphabet 'B'.

The above descriptions describe the desired word the terminal user intends to input is equal to the predicted word. However, the predicted word is not always equal to the user-desired word. Accordingly, in the following description, a method of inputting the desired word different from the predicted word is explained with reference to FIGS. 12A to 12D.

Further, in the following description, if a desired key button is touched, a corresponding intrinsic alphabet is input. Second or higher-order alphabets of a predicted word, which can be input if the desired key button is re-touched, are provided to the user by one of the methods described with reference to FIGS. 5A to 11B. However, for clarity of the following description, the second or higher-order alphabets of the predicted word are provided to the user by the method described with reference to FIGS. 5A to 5C.

Figure 12A:
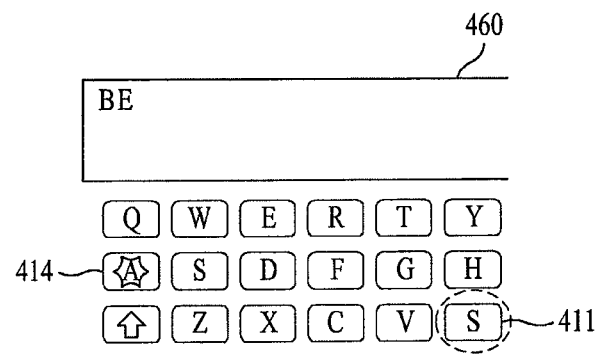

The following description also assumes the predicted word is 'BEST', whereas the desired word is 'BEAST'. Referring to FIG. 12A, when the user touches the first key button 411 consecutively twice, the alphabets 13' and 'E' are sequentially input and displayed in the input text window 460. In order to input the desired word, the alphabet 'A' should be input next to the already input alphabets 13' and 'E'. However, if the user touches the first key button 411 one more time, the alphabet 'S' will be input, which is different than the desired word 'BEAST'. Therefore, the user should not again touch the first key button 411.

Instead, the user touches a fourth key button 414 having the intrinsic alphabet 'A'. If so, referring to FIG. 12B, the intrinsic alphabet 'A' of the fourth key button 414 is input. In addition, an identifier of the first key button 411 is restored to an identifier of the intrinsic alphabet 13' of the first key button 411.

Based on the input alphabets 13', 'E' and 'A', the controller 180 predicts a desired word the user intends to input. Thus, the controller 180 is then able to recommend the predicted word to the user. Again, in the following description, for clarity, assume that the recommended word according to the input alphabets 13', 'E' and 'A' is 'BEAST'.

Figure 12B:
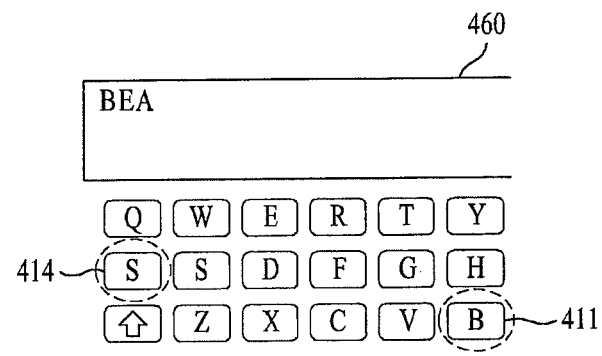
Figure 12C:
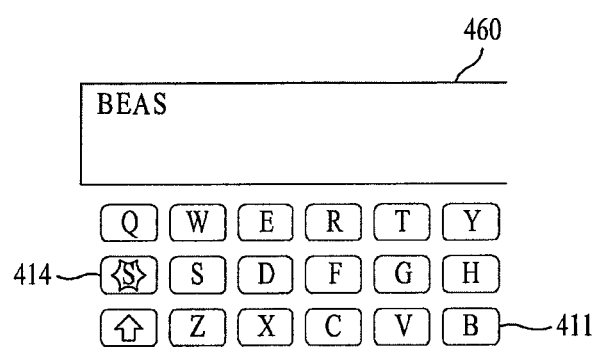

As the predicted word is predicted, referring to FIG. 12B, an identifier of the intrinsic alphabet 'A' displayed on the fourth key button 414 is converted to an identifier of the fourth alphabet 'S' of the predicted word. Subsequently, referring to FIG. 12C, the user again touches the fourth key button 414, and the fourth alphabet 'S' of the predicted word is input and displayed in the input text window 460.

Figure 12D:
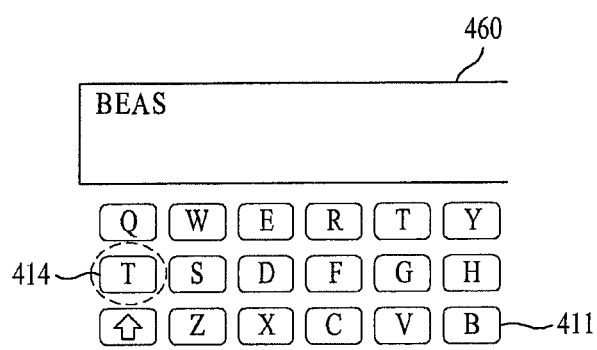

Finally, referring to FIG. 12D, the controller 180 changes the identifier of the fourth alphabet 'S' of the predicted word displayed on the fourth key button 414 to an identifier of a fifth alphabet 'T' of the predicted word. In FIGS. 12A to 12D, in case that an alphabet, which can be input by repeatedly touching the first key button, becomes different from an alphabet the user intends to input, the user can correctly input the alphabet the user intends to input by touching another key button having an intrinsic alphabet equal to the alphabet the terminal user intends to input.

Meanwhile, when the desired word is 'BBC', and if 'B' is input by touching the first key button 411, the controller 180 predicts the word 'BEST'. Subsequently, if the first key button 411 is re-touched, the alphabet 'E' will be input. Therefore, the desired word 'BBC' is not correctly input. To solve this problem, the following method is further explained with reference to FIG. 13A and FIG. 13B.

Figure 13A:
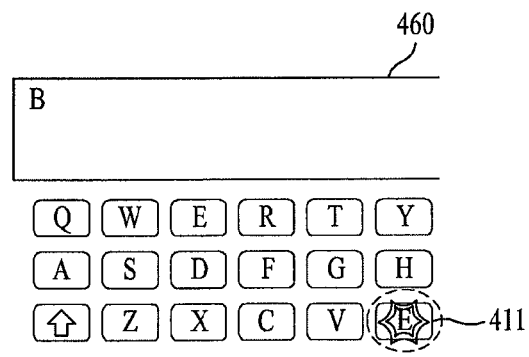
Figure 13B:
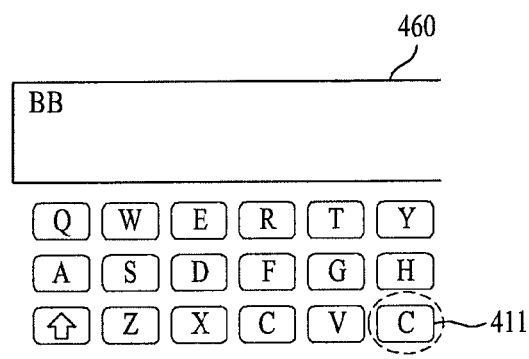

Referring to FIG. 13A, if the user touches the first key button 411, the intrinsic alphabet 'B' of the first key button 411 is input. The input intrinsic alphabet 'B' is also displayed in the input text window 460, for example. Moreover, an identifier of the second alphabet 'E' of the predicted word 'BEST' is displayed on the first key button 411.

In this instance, a double-touch or a long touch is performed on the first key button 411. Further, FIG. 13A shows that the first key button 411 is double touched. If so, referring to FIG. 13B, the intrinsic alphabet 'B' of the first key button 411 is input instead of the second alphabet 'E' of the predicted word 'BEST' displayed on the first key button 411. The input intrinsic alphabet 'B' is further displayed in the input text window 460.

Based on the input alphabets 'B' and 'B', the controller 180 predicts a desired word the user intends to input. The controller 180 is then able to recommend the predicted word to the user. In the following description, for clarity, the predicted word according to the input alphabets 'B' and 'B' is 'BBC'. Finally, an identifier of the third alphabet 'C' of the predicted word 'BBC' is displayed on the first key button 411.

Figure 14A:
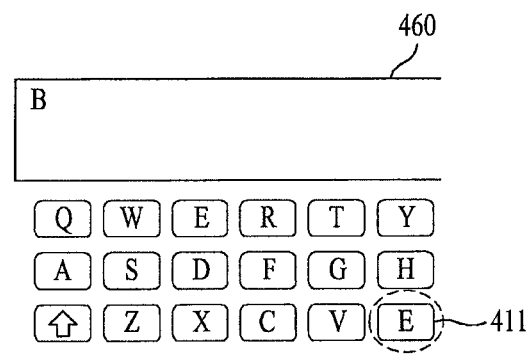
Figure 14B:
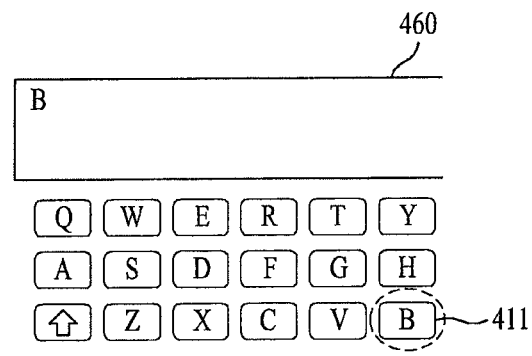

The following description describes another method of inputting the desired word 'BBC' with reference to FIGS. 14A to 14D. Referring to FIG. 14A, if the user touches the first key button 411, the intrinsic alphabet 'B' of the first key button 411 is input and displayed in the input text window 460, for example. Moreover, the controller 180 displays an identifier of the second alphabet 'E' of the predicted word 'BEST' on the first key button 411.

Also, assume the user does not touch the keypad 410 during a prescribed period of time (e.g., 0.5 second, 1 second, etc.). If so, the controller 180 controls each corresponding identifier of all alphabet key buttons of the keypad to be restored to identifiers of the original intrinsic alphabets. Therefore, referring to FIG. 14B, an identifier of the second alphabet 'E' of the recommended word 'BEST' displayed on the first key button 411 is changed to an identifier of an intrinsic alphabet 'B' of the first key button 411.

Figure 14C:
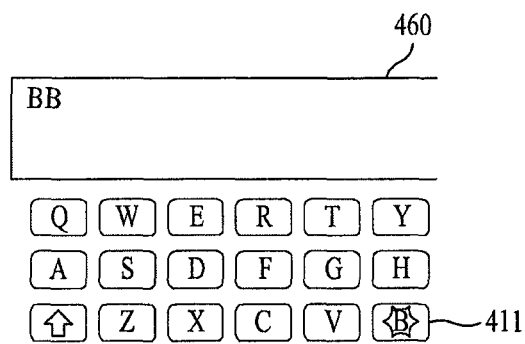
Figure 14D:
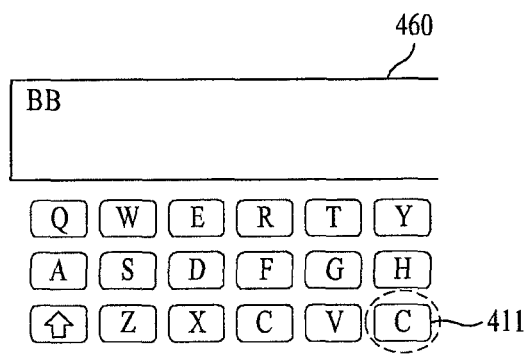

Referring to FIG. 14C, the user re-touches the first key button 411. Then, the intrinsic alphabet 'B' of the first key button 411 is input and displayed in the input text window 460. Further, the controller 180 predicts the recommended word 'BBC' based on the input alphabets 'B' and 'B'. Therefore, referring to FIG. 14D, an identifier of the third alphabet 'C' of the recommended word 'BBC' is displayed on the first key button 411.

Further, in FIGS. 14A to 14D, if the keypad is not touched during a prescribed period of time, each corresponding identifier of all alphabet key buttons of the keypad is restored to an identifier of the original intrinsic alphabet. The following description explains another case that each corresponding identifier of all alphabet key buttons of the keypad is restored to an identifier of an original intrinsic alphabet with reference to FIGS. 15A and 15B.

Figure 15A:
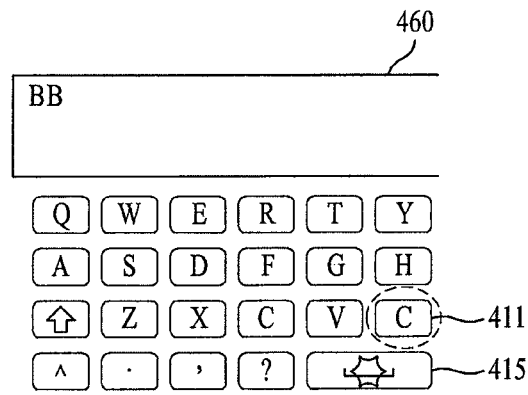

Referring to FIG. 15A, the alphabets 'B' and 'B' are displayed in the input text window 460. In addition, an identifier of a third alphabet 'C' of the predicted word 'BBC' is displayed on the first key button 411. Further, one of the additional key buttons is touched by the user. In FIG. 15A, the user touches a 'space' key button 415.

Figure 15B:
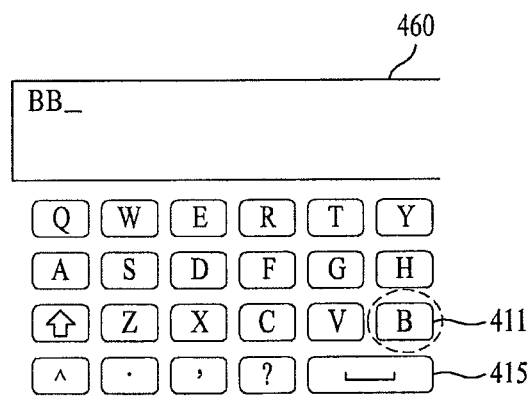

If so, referring to FIG. 15B, the space is input to the mobile terminal 100, and the identifier of the third alphabet 'C' of the predicted word 'BBC' displayed on the first key button 411 is converted to an identifier of the intrinsic alphabet of the first key button 411.

Figure 16A:
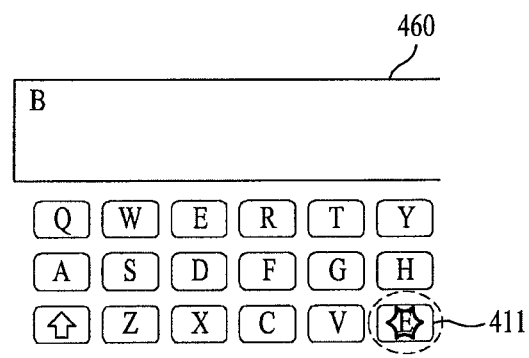

Referring to FIG. 16A, if the user touches the first key button 411, the intrinsic alphabet 'B' of the first key button 411 is input and displayed in the input text window 460, for example. Moreover, an identifier of the second alphabet 'E' of the predicted word 'BEST' is displayed on the first key button 411.

In this instance, the user performs a double-touch or a long touch operation on the first key button 411. FIG. 16A shows the user long touching the first key button 411. If so, referring to FIG. 16B, a first priority predicted word 'BEST' according to the input intrinsic alphabet 'B' is displayed on the touchscreen 400.

Subsequently, the user performs a simple or single touch, which is neither a double touch nor a long touch, on the first key button 411 instead of the double or long touch. If so, referring to FIG. 16C, a second priority predicted word 'BEAST' according to the input intrinsic alphabet 'B' is displayed on the touchscreen 400. Subsequently, the user performs a double or long touch operation on the first key button 411. FIG. 16C shows the user long touching the first key button 411. Alternatively, the second priority predicted word 'BEAST' is touched on the touchscreen 400.

Figure 16B:
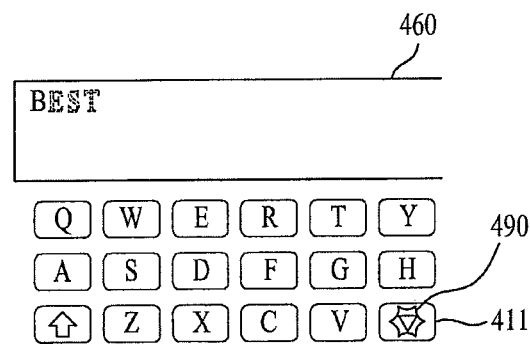
Figure 16C:
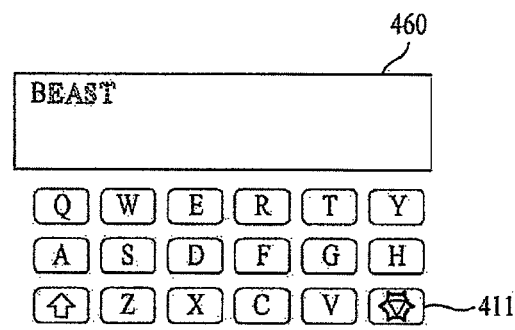
Figure 16D:
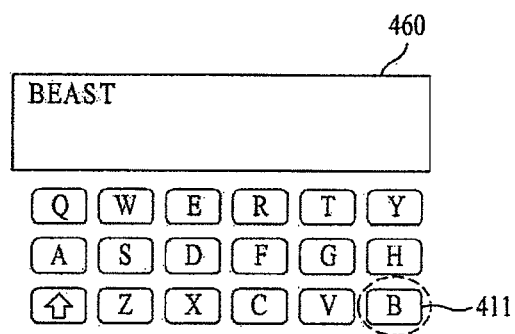

If so, referring to FIG. 16D, the second priority predicted word 'BEAST' is input. Further, in FIGS. 16A to 16D, the predicted words are displayed one by one, by which the present embodiment is non-limited. For example, a plurality of predicted words including the first and second priority predicted words can be simultaneously displayed. Then, if one of the displayed predicted words is touched, for example, the selected predicted word is input.

In addition, FIG. 16B also illustrates an indicator 490 being displayed on the key button 411. In this embodiment, the user can select the indicator 490 to view a list of predicted words. The user can then select one predicted word that matches their desired word. The predicted words may also be displayed one at a time or be displayed in a list format. The indicator 490 can also be displayed anywhere on the touch screen such as in the display portion 460. A pop-up window can also be displayed that includes the list of predicted words.

In addition, the controller 180 can predict words the user intends to input based on previously input words, based on common words, based on words in a dictionary, based on predetermined words set by a user, etc. Thus, once the user enters the first character, the controller 180 can search words stored in the memory and provide the user with one or more predicted words.

Accordingly, the present invention provides several advantages. For example, according to at least one of the embodiments of the present invention, the user can easily input characters via a keypad on the mobile terminal having key buttons of which number or size is smaller than that of key buttons provided to a keyboard of a personal computer.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via the Internet). In addition, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A digital television comprising:
a display unit configured to display a keypad including a plurality of key buttons assigned with different alphabet characters, respectively; and
a controller configured to:
receive a first selection of a first key button of the plurality of key buttons,
input a first alphabet character assigned to the first key button in a text input box of the display unit,
predict a word that starts with the first alphabet character,
generate a first sub key button assigned with a second alphabet character of the predicted word on the keypad, wherein the first sub key button is displayed at a location to adjoin the first key button on the keypad, the first sub key button partially overlapping a second key button neighboring to the first key button,
receive a second selection of the first sub key button,
input the second alphabet character next to the first alphabet character in the text input box, and
generate a second sub key button assigned with a third alphabet character of the predicted word, wherein the second sub key button is displayed at the same location as the first sub key button, the second sub key button partially overlapping the same second key button neighboring to the first key button.

2. The digital television of claim 1, wherein the controller is configured to display the first sub key button together with information about the predicted word on the display unit.

3. The digital television of claim 2, wherein the controller is configured to:
receive a third selection of the information about the predicted word, and input the rest of the alphabet characters of the predicted word at the same time such that the rest of the alphabet characters are input next to the first and second characters in the text input box.

4. The digital television of claim 1, wherein the controller is configured to concurrently display both the first sub key button assigned with the second alphabet character and a third key button assigned with the same second alphabet character.

5. The digital television of claim 4, wherein the controller is configured to replace the first sub key button with the second sub key button at the location.

6. The digital television of claim 5, wherein the controller is configured to concurrently display both the second sub key button assigned with the third alphabet character and a fourth key button assigned with the same third alphabet character.

7. The digital television of claim 2, wherein the controller is configured to:
 display the first and second alphabet characters of the predicted word in a first style, and
 display the rest of the alphabet characters of the predicted word in a second style different from the first style.

8. A method of controlling a digital television, the method comprising:
 displaying, via a display unit, a keypad including a plurality of key buttons assigned with different alphabet characters, respectively;
 receiving, via a controller, a first selection of a first key button of the plurality of key buttons;
 inputting, via the controller, a first alphabet character assigned to the first key button in a text input box of the display unit;
 predicting, via the controller, a word that starts with the first alphabet character;
 generating, via the controller, a first sub key button assigned with a second alphabet character of the predicted word on the keypad, wherein the first sub key button is displayed at a location to adjoin the first key button on the keypad, the first sub key button partially overlapping a second key button neighboring to the first key button;
 receiving, via the controller, a second selection of the first sub key button;
 inputting, via the controller, the second alphabet character next to the first alphabet character in the text input box; and
 generating, via the controller, a second sub key button assigned with a third alphabet character of the predicted word, wherein the second sub key button is displayed at the same location as the first sub key button to adjoin the first key button on the keypad, the second sub key button partially overlapping the same second key button neighboring to the first key button.

9. The method of claim 8, further comprising:
 displaying the first sub key button together with information about the predicted word on the display unit.

10. The method of claim 8, further comprising:
 concurrently displaying both the first sub key button assigned with the second alphabet character and a third key button assigned with the same second alphabet character.

11. The method of claim 10, further comprising:
 replacing the first sub key button with the second sub key button at the location.

12. The method of claim 11, further comprising:
 concurrently displaying both the second sub key button assigned with the third alphabet character and a fourth key button assigned with the same third alphabet character.

* * * * *